US012640626B2

(12) United States Patent
Bender et al.

(10) Patent No.: US 12,640,626 B2
(45) Date of Patent: May 26, 2026

(54) ELECTRICAL MACHINE WITH A FLUID-COOLED POWER TRANSMISSION DEVICE AND VEHICLE WITH SUCH ELECTRICAL MACHINE

(71) Applicant: ZF Friedrichshafen AG, Friedrichshafen (DE)

(72) Inventors: Jörg Bender, Würzburg (DE); Tobias Dieckhoff, Würzburg (DE); Philipp Neidhardt, Markdorf (DE); Joao Bonifacio, Meckenbeuren (DE); Alexander Büttner, Sulzthal (DE); Tobias Höche, Hallstadt (DE); Rene Budach, Bad Kissingen (DE); Robert Lechner, Schweinfurt (DE); Jens Schönekäs, Grafenrheinfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 229 days.

(21) Appl. No.: 18/641,016

(22) Filed: Apr. 19, 2024

(65) Prior Publication Data
US 2024/0356412 A1      Oct. 24, 2024

(30) Foreign Application Priority Data
Apr. 21, 2023      (DE) ..................... 10 2023 203 680.0

(51) Int. Cl.
*H02K 9/19*          (2006.01)
*B60K 1/00*          (2006.01)
(Continued)

(52) U.S. Cl.
CPC ................. *H02K 9/19* (2013.01); *H02K 1/32* (2013.01); *H02K 7/116* (2013.01);
(Continued)

(58) Field of Classification Search
CPC .......... H02K 9/19; H02J 50/005; H02J 50/10; H01F 38/18
(Continued)

(56) References Cited

FOREIGN PATENT DOCUMENTS

DE      10 2014 202 719 A1      8/2015
DE      10 2020 207 000 A1      12/2020
(Continued)

OTHER PUBLICATIONS

Office Action dated Feb. 22, 2024 for German Patent Application No. 10 2023 203 680.9 (9 pp.), note: pp. 1 and 2 are English language Explanations to Section C. Result of Determination Document.

*Primary Examiner* — Terrance L Kenerly
*Assistant Examiner* — Theodore L Perkins
(74) *Attorney, Agent, or Firm* — Crowell & Moring LLP

(57) ABSTRACT

An electric machine for a vehicle that has a housing, a rotor assembly which can rotate about a rotational axis in the housing, a contactless power transmission device for transmitting electricity to the rotor assembly, in which the power transmission device contains a housing transmitter and a rotor transmitter, wherein the housing transmitter contains a primary core and primary coil, and the rotor transmitter contains a secondary core and a secondary coil, wherein there is a fluid tube for supplying the rotor assembly with fluid that runs coaxially through the rotor assembly, in which the fluid tube has at least one fluid outlet inside the power transmission device, such that a fluid flow path runs through the power transmission device in order to cool the power transmission device.

15 Claims, 2 Drawing Sheets

(51) Int. Cl.
  *B60K 11/02* (2006.01)
  *F16H 57/04* (2010.01)
  *H02K 1/32* (2006.01)
  *H02K 7/116* (2006.01)

(52) U.S. Cl.
  CPC ......... *B60K 2001/006* (2013.01); *B60K 11/02* (2013.01); *F16H 57/0476* (2013.01)

(58) Field of Classification Search
  USPC ........................................................ 310/54
  See application file for complete search history.

(56) References Cited

FOREIGN PATENT DOCUMENTS

DE    10 2021 212 012 B3    4/2023
JP         2017-52335 A     3/2017

ELECTRICAL MACHINE WITH A FLUID-COOLED POWER TRANSMISSION DEVICE AND VEHICLE WITH SUCH ELECTRICAL MACHINE

CROSS-REFERENCE TO RELATED APPLICATION

This application claims priority to German Application No. DE 10 2023 203 680.0, filed on Apr. 21, 2023, the entirety of which is hereby fully incorporated by reference herein.

FIELD

The present disclosure relates to an electric machine for a vehicle, and also relates to a vehicle that has such an electric machine.

BACKGROUND

Drive motors for electric or hybrid vehicles must obtain electricity from a battery or the like for the electric motor. In particular with motors that have separate power sources, the rotor must be supplied with rotor voltage or current. Rotor voltage or current can be transmitted through contact, e.g. via sliding contacts, thus forming a potential source of failure for the vehicle drive with regard to continuous operation and the potential wear to the sliding contacts. Alternatively, the rotor voltage or current can be transmitted without contact, e.g. inductively.

DE 10 2014 202 719 A1 discloses an inductive rotary transmitter for an electric machine for a vehicle in which the rotary transmitter contains a first, preferably stationary, coupler element, and a rotating second coupler element, and is configured to transmit electricity between the first coupler element and the second coupler element in the manner of a power transformer, in which the second coupler element contains a support element and core supported thereon that can move within a predefined tolerance, with the support element containing at least two bearing surfaces that delimit the predefined tolerance, which are designed such that they apply bearing forces to the core when the second coupler element rotates, resulting in compression stress in the core in conjunction with the centrifugal force acting on the core caused by the rotation of the second coupler element.

SUMMARY

An object of the present disclosure is to create an electric machine of the type described above that is distinguished by an efficient cooling and a compact and inexpensive design.

This object is achieved with an electric machine that has the features disclosed herein and a vehicle that has the features disclosed herein. Advantageous or preferred embodiments can be derived from the description and the drawings.

The subject matter of the present disclosure is an electric machine that is suitable and/or designed for use in a vehicle. In particular, the electric machine is used to generate a drive torque for the vehicle. By way of example, the electric machine is a so-called traction motor. In particular, the electric machine is a separately excited motor, specifically a synchronous motor with a separate power source. The electric machine can be integrated in an electric drive train, preferably an electric axle. The electric drive train can be a purely electric or a hybrid drive train.

The electric machine has a housing. This housing forms an interior that is preferably fluid-tight. The housing is preferably composed of numerous parts. The housing can be subdivided into a base and at least one cover, preferably an end plate.

The electric machine contains a rotor assembly, which is supported such that it can rotate in the housing. The electric machine contains a stator in the housing, and the rotor assembly can rotate about its rotational axis in relation to the stator. The electric machine is preferably an internal rotor machine, in which the rotor assembly, in particular a rotor therein, is located inside the stator.

The drive unit contains a power transmission device with which electricity is transmitted to the rotor assembly in a contactless manner. In particular, rotor voltage or current is transmitted to the rotor assembly, specifically the rotor, by the power transmission device. The power transmission device contains a transmitter attached to the housing, and a transmitter attached to the rotor. In particular, the housing transmitter is stationary. The rotor transmitter is connected to the rotor for conjoint rotation. The rotor transmitter rotates at the rotational rate of the rotor assembly, and the rotor current, in particular an alternating current, is transmitted from the housing transmitter to the rotor transmitter. This type of power transmission device is an inductive power transmission device.

The housing transmitter has a primary core and a primary coil, and the rotor transmitter has a secondary core and a secondary coil. The primary coil is on the primary core, and the secondary coil is on the secondary coil. The primary coil and secondary coil are offset radially. The primary coil and secondary coil are at least partially, or even entirely, concentric within the rotor assembly. The primary coil and/or secondary coil form rings, and the primary core is coaxial and/or concentric to the primary coil inside the inner ring, and/or the secondary core is coaxial and/or concentric to the secondary coil in the outer ring. The primary core and/or secondary core can be made of a highly permeable material, e.g. ferrite, in order to obtain a low magnetic resistance.

It is proposed within the framework of the present disclosure that the electric machine contain a tube with which the rotor assembly is supplied with a fluid. The tube has at least one outlet inside the power transmission device, through which fluid flows through the power transmission device for cooling purposes. In short, the fluid flows into the tube and is distributed from there through the at least one outlet into the power transmission device. This fluid can be a water-based and/or alcohol-based coolant. The fluid can also be an oil, in particular transmission fluid. The fluid serves to cool the rotor assembly and/or the electric machine. The fluid can also be used to lubricate the rotor assembly and/or the electric machine. In principle, the fluid outlet can open axially toward the rotational axis. The tube can also contain at least one more outlet within the power transmission device. The at least one more outlet can be offset circumferentially and/or axially to the first outlet along the rotational axis. In particular, the tube passes coaxially and/or concentrically through the rotor assembly. The tube is stationary within the housing. The tube is preferably secured at both ends within the housing and/or electric machine.

The present disclosure takes into account that the power transmission device, in particular in synchronous motor with separate power supplies, is normally located on the end of a transmission (reducer) opposite the gearing. To prevent overheating resulting in damage to the power transmission device, it must be cooled. It is therefore proposed that the power transmission device be supplied with a fluid by the tube, preferably a transmission fluid from the transmission, to cool the power transmission device. Because the tube is already used to cool the rotor assembly, the fluid can be easily conveyed from the transmission to the power transmission device. One advantage with this is that it is possible to use a single cooling system to cool both the power transmission device and the rotor assembly, without the need for a separate cooling system for the power transmission device. This reduces not only the costs, but also size and weight.

In one design, the rotor transmitter contains an electronics assembly with which rotor current received by the secondary coil, in particular alternating current, is converted to direct current and supplied to the rotor in the rotor assembly. In particular, the power transmission device is connected to power electronics, preferably by the housing transmitter, with which the rotor is supplied with a rotor voltage or current, and the stator is supplied with stator voltage or current. The electronics assembly preferably contains a printed circuit board and switches, intermediate circuit capacitors and other electronic and electric components that form a rectifier circuit for converting the alternating current to direct current.

With this design, the fluid outlet is located in the electronics assembly, and/or at least part of the fluid flow path runs through the electronics assembly. In particular, the fluid in the flow path is in direct thermal contact with the electronics assembly, preferably with at least one component in the electronics assembly that requires cooling. The fluid preferably flows through and/or around the electronics assembly. This results in a particularly efficient cooling of the electronics assembly and any temperature-sensitive components.

In one embodiment, it is proposed that the fluid path within the power transmission device is divided into at least two subsidiary paths, the first of which passes over the housing transmitter, with the second passing over the rotor transmitter. In short, the first subsidiary path is used to cool the housing transmitter, and the second subsidiary path is used to cool the rotor transmitter. This division preferably takes place within the electronics assembly. The first subsidiary path can run substantially in the axial direction with respect to the rotational axis, and the second subsidiary path can run substantially in the radial direction with respect to the rotational axis within the power transmission device. The first and second subsidiary paths are preferably separated from one another by the power transmission device. In principle, the two subsidiary paths can rejoin one another leaving the rotor assembly after passing through the power transmission device. They can also remain separate after leaving the rotor assembly once they have passed through the power transmission device. Specifically, a volumetric flow is generated along the first and/or second subsidiary paths caused by the centrifugal forces of the rotating rotor assembly. This results in a simple and cost-effective cooling of the power transmission device, in particular the two transmitters.

Concretely, the first subsidiary path runs between the primary core and secondary core, and/or between the primary coil and secondary coil, and the second subsidiary path runs through the electronics assembly. In particular, an annular gap is formed between the primary core and secondary core, and/or between the primary coil and secondary coil, through which the first subsidiary path runs, and/or is separated from the second subsidiary path. In principle, the first and/or second subsidiary path can be defined, and/or diverted, and/or divided by the components of the power transmission device. The power transmission device can also contain at least one fluid-conducting element with which the fluid path can be divided into the first and second subsidiary paths. This results in a particularly efficient cooling of the power transmission device, or the two transmitters.

In one embodiment, the at least one fluid outlet is a nozzle with which a component that needs to be cooled in the power transmission device can be sprayed with the fluid. In the simplest case, the nozzle can be formed by a hole. The fluid can preferably be sprayed through the nozzle directly onto the component that requires cooling. This can be a component in the electronics assembly, in particular a printed circuit board, diodes, and/or electric or inductive coils. This results in targeted cooling of specific components that require such.

In one embodiment, the rotor assembly contains a receiver for the power transmission device. In particular, the rotor assembly contains a rotor shaft, and a transmission shaft, the two of which are connected to one another for conjoint rotation and collectively define the rotational axis. The rotor is preferably on the rotor shaft, and the transmission shaft has a gearwheel on it. These shaft sections are preferably hollow, such that the fluid tube can pass through them. The receiver for accommodating the power transmission device is preferably formed on the rotor shaft. These two shafts can preferably be made of the same material, and formed as an integral component. Alternatively, they can be separate components that are connected to one another for conjoint rotation. Specifically, the rotational axis can be parallel to an output shaft for the transmission.

In this embodiment, the receiver is delimited axially by an installation stop, and the at least one fluid outlet opens axially into the area between the housing transmitter and the stop. In short, the tube passes through the receiver, or extends at least a partly therein, to supply it with fluid. Specifically, the at least one fluid outlet opens into the area between the housing and rotor transmitters, preferably between the primary core and the electronics assembly. In particular, the rotor transmitter and rotor assembly, specifically the rotor shaft, are connected to one another for conjoint rotation in a form-fitting and/or force-fitting manner. The receiver can also be delimited by a locking stop at the other end of the rotational axis. The rotor transmitter, in particular the secondary core and electronics assembly, is preferably braced axially against the two stops in a form-fitting manner. The installation stop is preferably formed as an integral part of the rotor shaft, e.g. in the form of a circumferential web. This stop can also be a separate part, e.g. a locking ring. By placing the fluid outlet in the receiver, the fluid can be conveyed directly therein to cool the components surrounding it, particularly the electronics assembly. Moreover, by placing the fluid outlet between the two transmitters, they are cooled evenly.

In one embodiment, the rotor assembly, in particular the rotor shaft, contains a hollow chamber, which is delimited at one end by the by the installation stop. The fluid tube contains at least one more outlet in this case, which opens into the hollow chamber such that another fluid path runs through this chamber for cooling the rotor in the rotor assembly. In particular, the hollow chamber forms an annular chamber encompassing the rotational axis, formed radially between the fluid tube and an inner circumference of the rotor assembly, particularly the rotor shaft. The other fluid outlet opens radially toward the rotational axis. In principle, the other outlet can be placed anywhere within the hollow chamber. This outlet is preferably near, and/or adjacent to, the installation stop, such that at least part of the other fluid path runs over the installation stop to the inner circumference of the rotor assembly, in particular the rotor shaft. In particular, this fluid path first runs substantially radially along the installation stop in relation to the rotational axis, and subsequently axially along the inner circumference. The two fluid paths are preferably separated from one another by the installation stop and/or the electronics assembly. The second fluid path results in a particularly efficient cooling of the entire rotor assembly.

In another embodiment, the power transmission device, in particular the rotor transmitter, preferably the electronics assembly, is thermally coupled to the installation stop, and part of the second fluid path runs along this stop in order to cool it. The fluid is preferably conducted in this path to cool the installation stop, transferring heat therefrom to the fluid. In particular, "thermally coupled" in this context means that the power transmission device, specifically the printed circuit board, is placed in the receiver such that heat is transferred to the installation stop. This heat transference preferably takes place by conducting heat through the mechanical contact to the electronics assembly, specifically the printed circuit board, through the installation stop. In particular, the installation stop extends substantially radially in relation to the rotational axis and/or in a radial plane of the rotational axis, and the electronics assembly, specifically the printed circuit board, bears on the surface of the installation stop. This results in a cooling of the power transmission device from both sides, particularly the electronics assembly, thus improving the cooling thereof, and preventing overheating of the temperature-sensitive components, particularly the electronics assembly.

In another embodiment, the installation stop has at least one, preferably central, opening, which is bordered by the power transmission device, preferably the electronics assembly, specifically the printed circuit board, and part of the second fluid path passes through the opening to cool the power transmission device. The fluid is preferably conducted along the second fluid path in order to cool and remove heat from the power transmission device, specifically the printed circuit board, by transferring heat from the power transmission device to the fluid. Specifically, part of second fluid path runs through the opening, along the back of the electronics assembly, specifically the printed circuit board. This results in a direct conveyance of the fluid through second fluid path to the power transmission device, in particular the electronics assembly, further improving the cooling effect.

In another embodiment of the present disclosure, the rotor assembly, preferably the rotor shaft, has at least one opening through which fluid exits the receiver and/or at least one more opening through which fluid exits hollow chamber. In particular, these openings are placed and/or designed such that fluid is removed substantially radially through the respective openings, and the two fluid paths run in the radial direction through the respective openings. In principle, the rotor assembly can contain at least one opening for the first and second subsidiary flow paths. The rotor assembly can also contain at least one separate opening for the first and second subsidiary flow paths. These openings can be oriented in the same or different directions. By way of example, the opening for the first subsidiary flow path can have an axial orientation, and the opening for the second subsidiary flow path can have a radial orientation. Specifically, the rotor assembly can have numerous first and/or second openings evenly distributed over the circumference. This results in a removal of the fluid from the receiver and the hollow chamber, such that a substantially constant flow is generated, and the fluid does not back up. This reduces drag losses, and improves the cooling of the rotor assembly.

In another embodiment, the housing is divided into a motor chamber and a transmission chamber, and the at least one fluid opening connects the receiver to the motor chamber, and/or the at least one other opening connects the hollow chamber to the motor chamber. In particular, the first fluid path runs through the first opening and/or the second fluid path runs through the second opening into the motor chamber. In short, the fluid is removed or discharged from the rotor assembly through the openings into the motor chamber and subsequently collected in the motor chamber and/or transmission chamber. In particular, the fluid is collected in the motor chamber and/or transmission chamber, e.g. in an oil pan, and subsequently returned to the fluid tube. The motor chamber and transmission chamber are preferably connected to one another for fluid exchange. By way of example, the motor chamber and transmission chamber can form wet chambers. Consequently, the fluid in the transmission chamber can be easily and cost-effectively used for cooling and lubricating the entire rotor assembly, and other components in the motor chamber, e.g. the stator.

In another embodiment, the stator has a coil with winding heads at each end. The at least one fluid opening is designed and/or placed such that the fluid can be supplied to the winding heads at the first end due to the centrifugal force when the rotor assembly rotates. The at least one second fluid opening can also be designed and/or placed such that the fluid can be supplied to the winding heads at the second end due to the centrifugal force generated when the rotor assembly rotates. In particular, the openings are placed at the respective ends, and/or oriented toward the winding heads and/or open axially or radially such that fluid is substantially discharged radially, toward the winding heads, due to the centrifugal force generated when the rotor assembly rotates. This results in a simple cooling of the winding heads with the fluid from the receiver or the hollow chamber.

In one embodiment, the fluid tube is attached at one end to the housing and the other end to the housing transmitter, preferably the primary core, and/or the housing, such that the fluid intake is at the first end, in particular at the other end of the power transmission device. In particular, the fluid intake conducts fluid out of the transmission chamber. The housing preferably has a receiver for the tube, into which the first end of the tube, in particular the fluid intake end, is inserted. The primary core is preferably connected to the housing at one end, and accommodates the end of the fluid tube at the other end. The primary core has a second tube receiver for this, in which the second end of the fluid tube is inserted. The fluid tube can also pass through the primary core, in which case the second end of the tube is received directly in the housing, particularly the cover thereof. The primary core can have a hole through which the tube passes, and the second receiver for the second end of the tube can be in the housing. The ends can be received in the respective receivers with a certain amount of radial and/or axial play. The first and/or second ends can also be received without any radial and/or axial play, preferably in a form-fitting and/or force-fitting manner. Specifically, the first end extends from the transmission shaft at the transmission end, and the second end extends from the rotor shaft at the rotor end. The primary core therefore has a dual function, i.e. transferring rotor current, and acting as a mechanical element that supports or stabilizes the fluid tube. Moreover, by receiving the tube in the primary core, it is supplied directly with fluid, and therefore cooled particularly effectively.

In one embodiment, the fluid intake can be supplied with fluid from the housing, in particular the motor chamber and/or transmission chamber. In principle, the fluid intake can be supplied with fluid from the housing passively. This passive supply can be obtained for example through a conveyance effect generated by the transmission gears as they rotate through the oil pan, thus drawing fluid therefrom. One advantage with this is that only one fluid supply is needed to conduct the fluid through the electric machine.

The present disclosure also relates to a vehicle that contains the electric machine according to any of the preceding, in which the electric machine functions as a drive motor for the vehicle. In particular, the drive torque serves as the main drive torque for the vehicle. The vehicle can be an electric vehicle or a hybrid vehicle.

Further features, advantages, and effects of the present disclosure can be derived from the following description of a preferred embodiment and the drawings.

DETAILED DESCRIPTION

Figure 1:
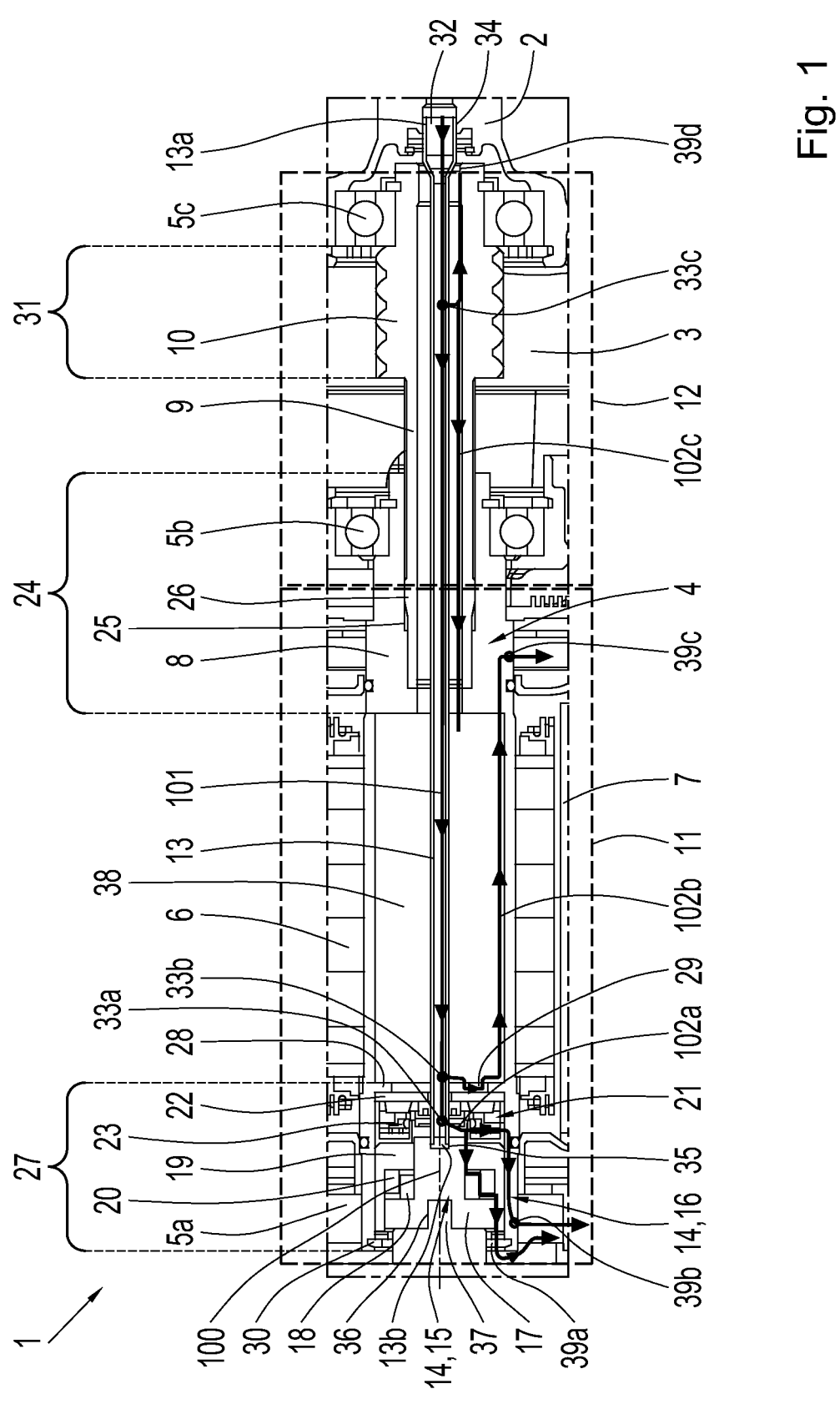
FIG. 1 shows a schematic sectional view of an electric machine that has a fluid tube as an exemplary embodiment of the present disclosure.

FIG. 1 shows an electric machine 1 for a vehicle as an exemplary embodiment of the present disclosure. The electric machine 1 can be used as an electric motor and as a generator. In this exemplary embodiment, the electric machine 1 is a synchronous motor with a separate power supply.

The electric machine 1 has a housing 2 that can be placed in the vehicle such that it is stationary therein. The housing 1 has numerous parts, e.g. two, and forms an interior chamber 3 that can be sealed in a fluid-tight manner.

The electric machine 1 also contains a rotor assembly 4, which is rotatably supported in the housing interior 3. The rotor assembly 4 is supported in the interior 3 of the housing 2 by three rotor bearings 5a, 5b, 5c.

The rotor assembly 4 contains a rotor 6 that interacts with a schematically indicated stator 7, which remains stationary in the housing 2, in order to generate the drive torque for the vehicle. The electric machine 1 has an internal rotor, which is located inside the stator 7.

The rotor assembly 4 has a rotor shaft 8 and a transmission shaft 9, which are connected to one another for conjoint rotation. The rotor shaft 8 supports the rotor 6, and the transmission shaft 9 supports a transmission gear 10 in the form of a spur gear. The rotor shaft 8 and transmission shaft 9 are each hollow.

The housing interior 3 is divided into a motor chamber 11 and a transmission chamber 12, in which the rotor shaft 8 is in the motor chamber, and the transmission shaft 9 is in the transmission chamber 12. The rotor bearings 5a and 5c are at the ends of the rotor assembly 4, and the rotor bearing 5b forms an intermediate bearing for the rotor assembly 4. The rotor bearings 5a and 5b support the rotor shaft 8 in the housing 2 and the rotor bearing 4c supports the transmission shaft 9 in the housing 2.

The electric machine 1 contains a fluid tube 13 that is coaxial to the rotor assembly 4, in particular the rotor shaft 8 and the transmission shaft 9, with which the rotor assembly 4 is supplied with a fluid, e.g. a coolant and/or lubricant.

The electric machine 1 also contains a power transmission device 14 which conducts rotor current from the power electronics, not shown, to the rotor 6. The power transmission device 14 is a contactless power transmission device 14, and transmits the power, or rotor current, inductively.

The power transmission device 14 contains a housing transmitter 15, which remains is stationary in the housing, in particular the motor chamber 11, and/or is connected to the housing 2, and a rotor transmitter 16 that can rotate in the housing 2, in particular the motor chamber 11, and/or is connected to the rotor assembly 4, in particular the rotor shaft 8, for conjoint rotation.

The housing transmitter 15 contains a primary core 17 and a primary coil 18, which is coaxial to the primary core 17. The rotor transmitter 16 contains a secondary core 19 and a secondary coil 20, which is coaxial to the secondary core 19. The primary core 17 and/or secondary core 19 can be made of a magnetic material, e.g. a ferrite material. The primary coil 18 and secondary coil 20 are annular coils.

In addition to the secondary core 19 and secondary coil 20, the rotor transmitter 16 also contains an electronics assembly 21, which converts the alternating current from the secondary coil 20 to a direct current for the rotor 6. The electronics assembly 21 contains a printed circuit board 22 and one or more electric and/or electronic components 23, e.g. power switches, capacitors, diodes, etc., which form a rectifier circuit.

The fluid tube 13 is stationary in the housing 2, and secured at both ends. One end 13a of the tube 13, specifically at the transmission end, is connected to the housing 2, and the other end 13b, specifically at the rotor end, is secured to the housing transmitter 15, specifically the primary core 17. By way of example, the first and/or second ends 13a, 13b can be attached to the respective components with or without play.

The rotor shaft 8 and transmission shaft 9 are connected to one another for conjoint rotation in a connecting region 24. The rotor shaft 8 has a socket 25 for this, and the transmission 9 has an insertion contour 26 that fits therein.

The rotor shaft 8 also has a receiver 27 at the end that accommodates the power transmission device 14. The primary coil 18 and secondary coil 20 are in the same part of the receiver 27, such that the power and/or rotor current are transmitted radially. The rotor assembly 4 has an installation stop 28, which delimits the receiver 27 in the axial direction of the rotational axis 100.

The rotor transmitter 16 can be inserted axially into the receiver 27 as a complete assembly or an individual component that locks in place therein, where it bears on the installation stop 28. The installation stop 28 can form a circumferential web, which is an integral part of, or made from the same material as, the rotor shaft 8. The installation stop 28 contains an opening 29 in the middle, which is delimited on the other side by the electronics assembly 21, or the printed circuit board 22. To secure the rotor transmitter axially, the electric machine 1 contains a locking stop 30, which is formed by a locking ring for example, which enables the insertion of the rotor transmitter 16.

The transmission shaft 9 can be connected to the transmission, not shown, in an engagement region 31 that is defined by the transmission element, preferably the gear teeth thereof. By way of example, the transmission shaft 9 can mesh with a gearwheel in the engagement region 31, e.g. a spur gear, in the transmission.

The fluid tube 13 has an intake 32 at the first end 13a, through which the fluid enters in the axial direction of the rotational axis 100. The tube 13 also contains numerous outlets 33a, 33b, 33c distributed along the axial direction of the rotational axis 100, which distribute the fluid radially within the rotor assembly 4 as needed to cool the rotor assembly 4 and the power transmission device 14 internally. The tube 13 has a constant diameter, which is widened to form the intake 32, while the outlets 33a, 33b, 33c are formed by holes therein. By way of example, the tube 13 can be connected at the intake 32 to a fluid supply, not shown, e.g. a pump, with which it is supplied with fluid from the motor chamber 11 and/or the transmission chamber 12.

The power transmission device 14 is normally at the end of the rotor shaft assembly 4 opposite the transmission or transmission element 10 in a synchronous machine with a separate power supply. The individual components in the power transmission device 14 must be cooled. Because the fluid is normally not at this end of the rotor shaft 8, it is proposed that the fluid tube 13 be extended into the power transmission device 14, such that a first outlet 33a is located between the primary core 17 and the installation stop 28, in particular the printed circuit board 22 therein, and a second outlet 33b is located outside the power transmission device 14 near the installation stop 28, in order to cool the power transmission device 14 with the fluid. The second end 13b of the tube 13 thus passes through the opening 29 and the electronics assembly 21 into the receiver 22. A third outlet 33c is inside the transmission shaft 9 in order to cool it.

The housing 2 contains a receiver 34 for the tube in the form of a hole that is coaxial to the rotational axis 100. The first end 13a of the tube 13 extends into the second receiver 34, such that the first end 13a, or the intake 32, is inside the housing 2. The primary core 17 has a second tube receiver 35 in the form of a recess that is coaxial to the rotational axis 100. The second end 13b of the tube 13 extends into this second receiver 35, such that it is accommodated in the primary core 17. By way of example, the first and second axial ends 13a, 13b are accommodated in the respective receivers 35, 36 in a form-fitting and/or force-fitting manner.

The primary core 17 has a coupling receiver 36 at the end facing away from the tube receiver 35, forming a second recess that is coaxial to the rotational axis 100. The housing 2 has a coupling pin 37, which is also coaxial to the rotational axis 100, and is connected in a form-fitting manner to the coupling receiver 36 for conjoint rotation. By way of example, the coupling pin 37 is formed on a cover for the housing 2, which is inserted axially into the coupling receiver 36 when installing the cover. As a result of connection for conjoint rotation, the primary core 17 is held in place when the rotor assembly 4 rotates.

The rotor shaft 8 contains a hollow chamber 38 that forms an annular chamber between the tube 13 and the inner circumference of the rotor shaft 8. The hollow chamber 38 is delimited by the base of the socket 25 at one end, and by the installation stop 28, or the electronics assembly 21 at the other end.

The rotor assembly 4 contains numerous openings 39a, 39b, 39c 39d through which fluid can exit. The first two openings 39a, 39b connect the receiver 27 to the motor chamber 11, such that the fluid can be conducted from the power transmission device 14 into the motor chamber 11. The at least one third opening 39c connects the hollow chamber 38 to the motor chamber 11 in order to conduct the fluid from the rotor shaft 8 into the motor chamber 11. The at least one fourth opening 39d connects the engagement region 31 to the transmission chamber 12 to conduct the fluid from the transmission shaft 9 into the transmission chamber 12. The centrifugal force causes the fluid to exit the interior of the rotor assembly 4.

The openings 39a, 39b, 39c are designed or placed such that the fluid is forced by the centrifugal force generated when the rotor shaft 8 rotates about the rotational axis 100 through the openings 39a, 39b toward the winding heads of a stator winding, not shown, on the first end of the stator 7, and through the opening 39c toward the winding heads of the stator winding on the second end of the stator 7, in order to cool the winding heads at both ends.

Figure 2:
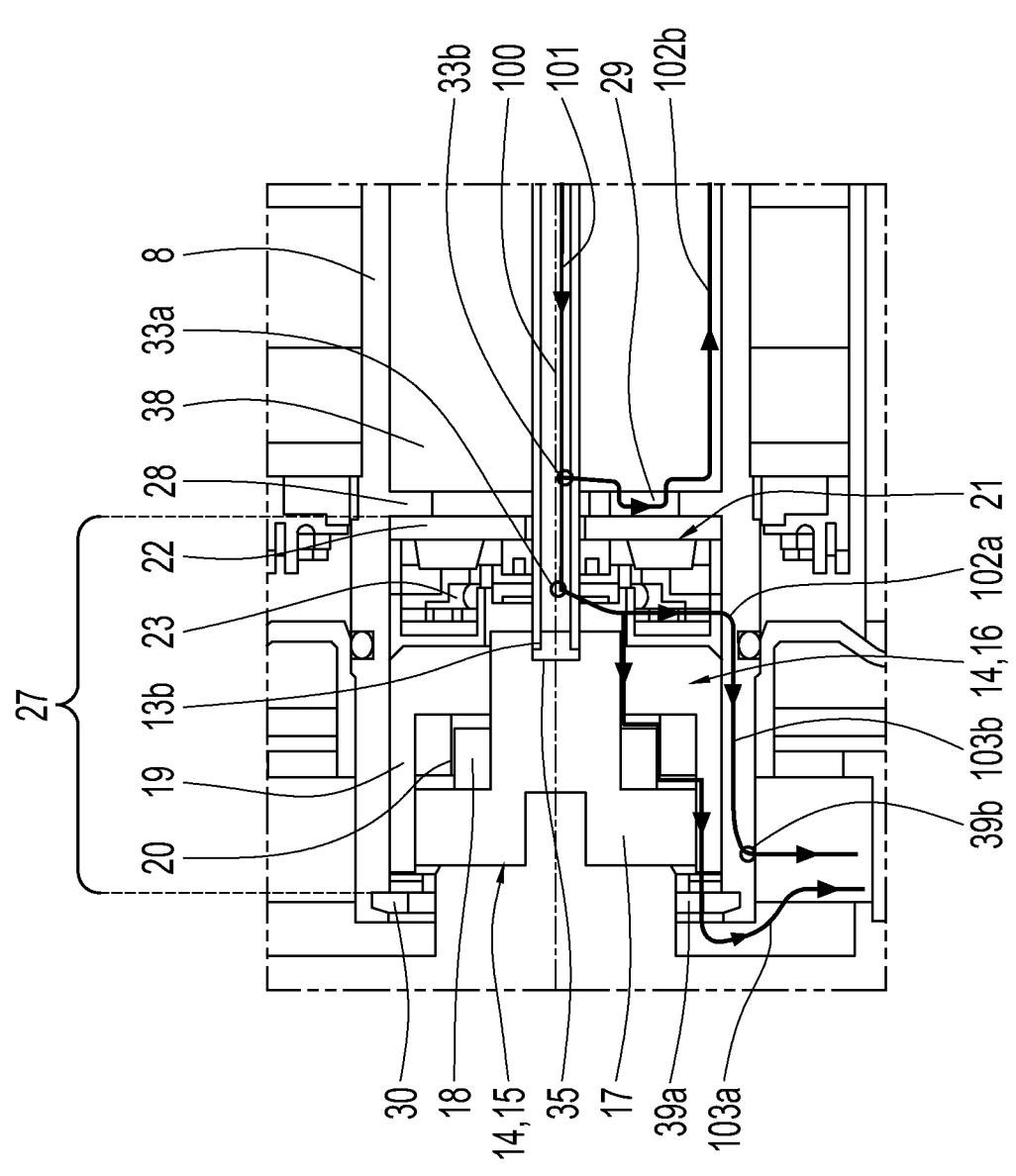
FIG. 2 shows a detail of the electric machine shown in FIG. 1.

FIG. 2 shows a detail of the electric machine 1 illustrating the flow path through the rotor assembly 4, in particular the power transmission device 14. The main flow path 101, as is also shown in FIG. 1, runs from the fluid intake 32 through the tube 13, with branches 102a, 102b, 102c at the individual outlets 33a, 33b, 33c. The first branch 102a runs from the first outlet 33a substantially through the power transmission device 14, the second branch 102b runs from the second outlet 33b substantially through the rotor shaft 8, and the third branch 102c runs from the third outlet 33c substantially through the transmission shaft 9.

As FIG. 2 shows, the first branch 102a is subdivided in the power transmission device 14 into first and second subsidiary paths 103a, 103b, the first of which 103a runs between the primary core 17 and secondary core 19 and between the primary coil 18 and secondary coil 20 to the first opening 39a, and the second subsidiary path 103b runs through the electronics assembly 21 to the second opening 39a. Consequently, fluid flows over or around the cores 17, 19, coils 18, 20, both transmitters 15, 16, and the components 23, or printed circuit board 22 in the electronics assembly 21, such that heat is removed along both subsidiary flow paths 103a, 103b, and the power transmission device 14, or the aforementioned components, are cooled. The fluid flowing along the first and second subsidiary flow paths 103a, 103b is separated from the receiver 27 into the motor chamber 11 through the openings 39a, 39b, discharged onto the winding heads at the first end of the stator 7, and subsequently collected in the motor chamber 11. By way of example, the first outlet 33a can be a nozzle that directs the fluid inside the receiver 27 toward one or more components 22, 23, in particular those components that are particularly sensitive to heat, in the electronics assembly 21.

The printed circuit board 22 bears axially on the installation stop 28, and is thermally coupled thereto, such that heat is transferred from the printed circuit board 22 to the installation stop 28. Parts of the other flow path 102b run along the installation stop 28 and through the opening 29 along the printed circuit board 22, and the other flow path 102b subsequently runs along the inner circumference to the third outlet 39c. Fluid therefore flows over or around the rotor shaft 8, the installation stop 28, and the printed circuit board 22 in the electronics assembly 21, such that heat is removed along the other flow path 102b, and the power transmission device 14, or the aforementioned components, are cooled. The fluid flowing along the other flow path 102b flows through the opening 39c from the hollow chamber 38 into the motor chamber 11, is discharged onto the winding heads at the second end of the stator 7, and subsequently collected in the motor chamber 11. By way of example, the second outlet 33b can also be a nozzle that directs the fluid inside the hollow chamber toward the installation stop 28 and/or the printed circuit board 22.

The motor chamber 11 and transmission chamber 12 are connected to one another for fluid exchange, such that the fluid collected in the motor chamber returns to the transmission chamber 12. The advantage with this is that the pump in the transmission can be used, instead of needing to integrate a second pump in the system for cooling the power transmission device 14.

REFERENCE SYMBOLS

1 electric machine
2 housing
3 housing interior
4 rotor assembly
5*a-c* rotor bearings
6 rotor
7 stator
8 rotor shaft
9 transmission shaft
10 transmission element
11 motor chamber
12 transmission chamber
13 fluid tube
14 power transmission device
15 housing transmitter
16 rotor transmitter
17 primary core
18 primary coil
19 secondary core
20 secondary coil
21 electronics assembly
22 printed circuit board
23 components
24 connecting region
25 socket
26 insertion contour
27 receiver
28 installation stop
29 opening
30 locking stop
31 engagement region
32 intake
33*a-c* outlets
34 tube receiver
36 second tube receiver
37 coupling receiver
38 hollow chamber
39*a-d* openings
100 rotational axis
101 main flow path
102*a-c* flow path branches
103*a, b* subsidiary flow paths

The invention claimed is:

1. An electric machine for a vehicle, comprising:
a housing;
a rotor assembly configured to rotate about a rotational axis in the housing;
a contactless power transmission device configured to transmit electricity to the rotor assembly, wherein the power transmission device comprises a housing transmitter and a rotor transmitter, wherein the housing transmitter comprises a primary core and a primary coil, and the rotor transmitter comprises a secondary core and a secondary coil;
a fluid tube that passes coaxially through the rotor assembly and configured to supply the rotor assembly with a fluid; and
at least one fluid outlet on the fluid tube inside the power transmission device, such that a fluid flow path runs through the power transmission device for cooling the power transmission device.

2. The electric machine according to claim 1, wherein the rotor transmitter comprises an electronics assembly configured to convert a rotor current received by the secondary coil and supply the converted rotor current to a rotor in the rotor assembly, and wherein the fluid outlet is inside the electronics assembly and/or at least part of the fluid flow path runs through the electronics assembly.

3. The electric machine according to claim 1, wherein the fluid flow path is divided into at least a first subsidiary flow path and a second subsidiary flow path inside the power transmission device, and wherein the first subsidiary flow path runs over the housing transmitter and the second subsidiary flow path runs over the rotor transmitter.

4. The electric machine according to claim 3, wherein the first subsidiary flow path runs between the primary core and the secondary core, and/or between the primary core and the secondary core, and wherein the second subsidiary flow path runs through the electronics assembly.

5. The electric machine according to claim 1, wherein the at least one fluid outlet is a nozzle configured to direct the fluid toward at least one temperature-critical component in the power transmission device.

6. The electric machine according to claim 1, wherein the rotor assembly comprises a receiver in which the power transmission device is accommodated, and which is axially delimited by an installation stop, and wherein the at least one fluid outlet opens axially into the receiver between the housing transmitter and the installation stop.

7. The electric machine according to claim 6, wherein the rotor assembly contains a hollow chamber that is axially delimited by the installation stop, and wherein at least one additional fluid outlet in the fluid tube opens into the hollow chamber such that a second fluid flow path runs through the hollow chamber to cool a rotor in the rotor assembly.

8. The electric machine according to claim 7, wherein the power transmission device is thermally coupled to the installation stop, and wherein part of the second fluid flow path runs along the installation stop to cool the installation stop.

9. The electric machine according to either claim 7, wherein the installation stop contains at least one opening that borders on the power transmission device, and wherein part of the second fluid flow path runs along the power transmission device in order to cool the power transmission device.

10. The electric machine according to claim 6, wherein the rotor assembly comprises at least one opening through which the fluid exits the receiver and/or at least one other opening through which the fluid exits the hollow chamber.

11. The electric machine according to claim 10, wherein the housing is divided into a motor chamber and a transmission chamber, wherein the at least one opening connects the receiver to the motor chamber, and/or the at least one other opening connects the hollow chamber to the motor chamber.

12. The electric machine according to claim 11, comprising:
a stator with a stator winding, which has winding heads at each end, wherein the openings are placed such that the fluid is supplied to the winding heads at one end due to a centrifugal force generated by a rotation of the rotor assembly, and/or the at least one other opening is placed such that the fluid is supplied to the winding heads at a second end due to the centrifugal force generated by the rotation of the rotor assembly.

13. The electric machine according to claim 1, wherein the fluid tube is attached to the housing at a first end and to the housing transmitter and/or the housing at a second end, wherein there is a fluid intake at the first end.

14. The electric machine according to claim 13, wherein the fluid intake is supplied with fluid from the housing.

15. A vehicle comprising:
the electric machine according to claim 1, wherein the electric machine is a drive motor for the vehicle.

* * * * *